United States Patent Office 3,546,864
Patented Dec. 15, 1970

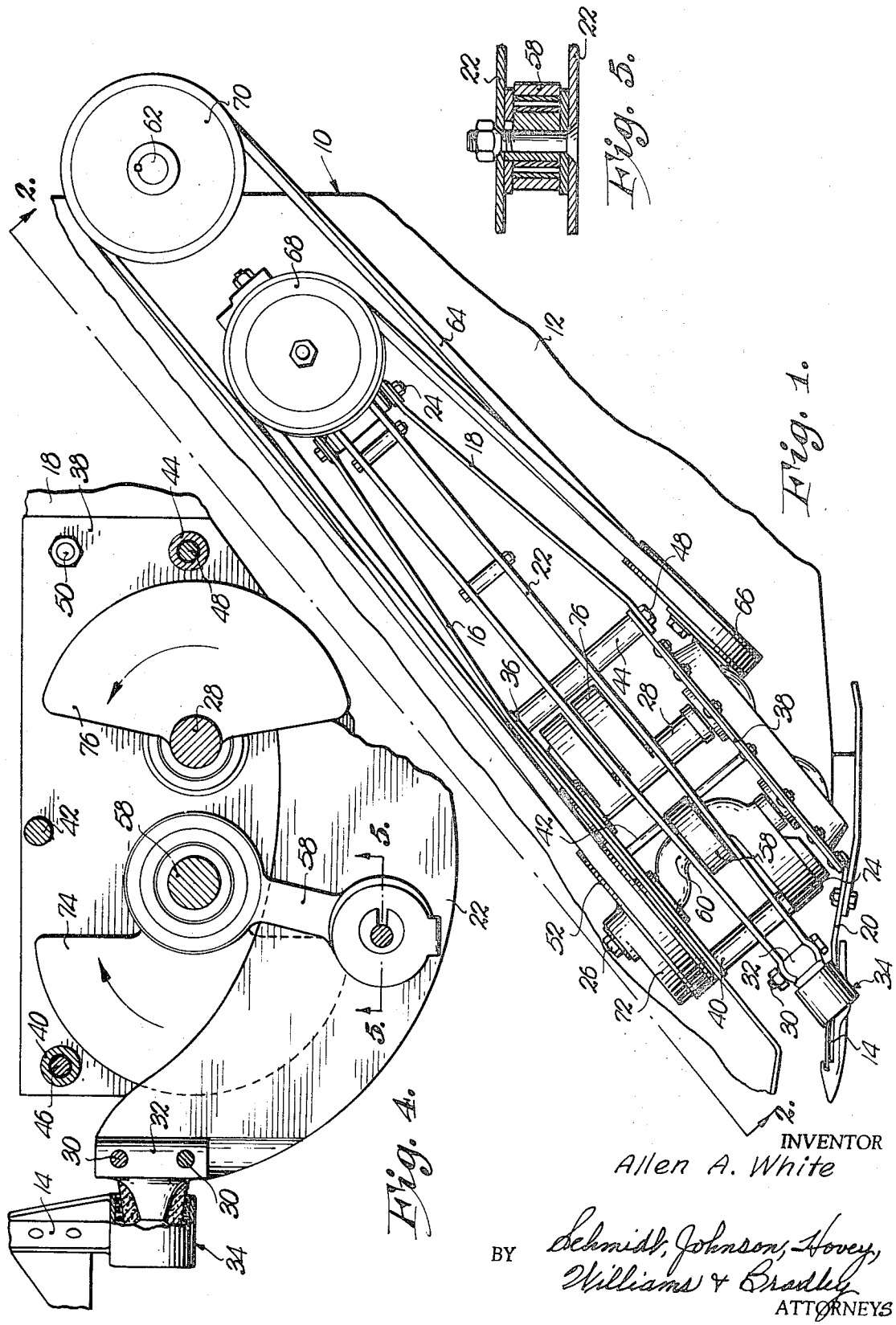

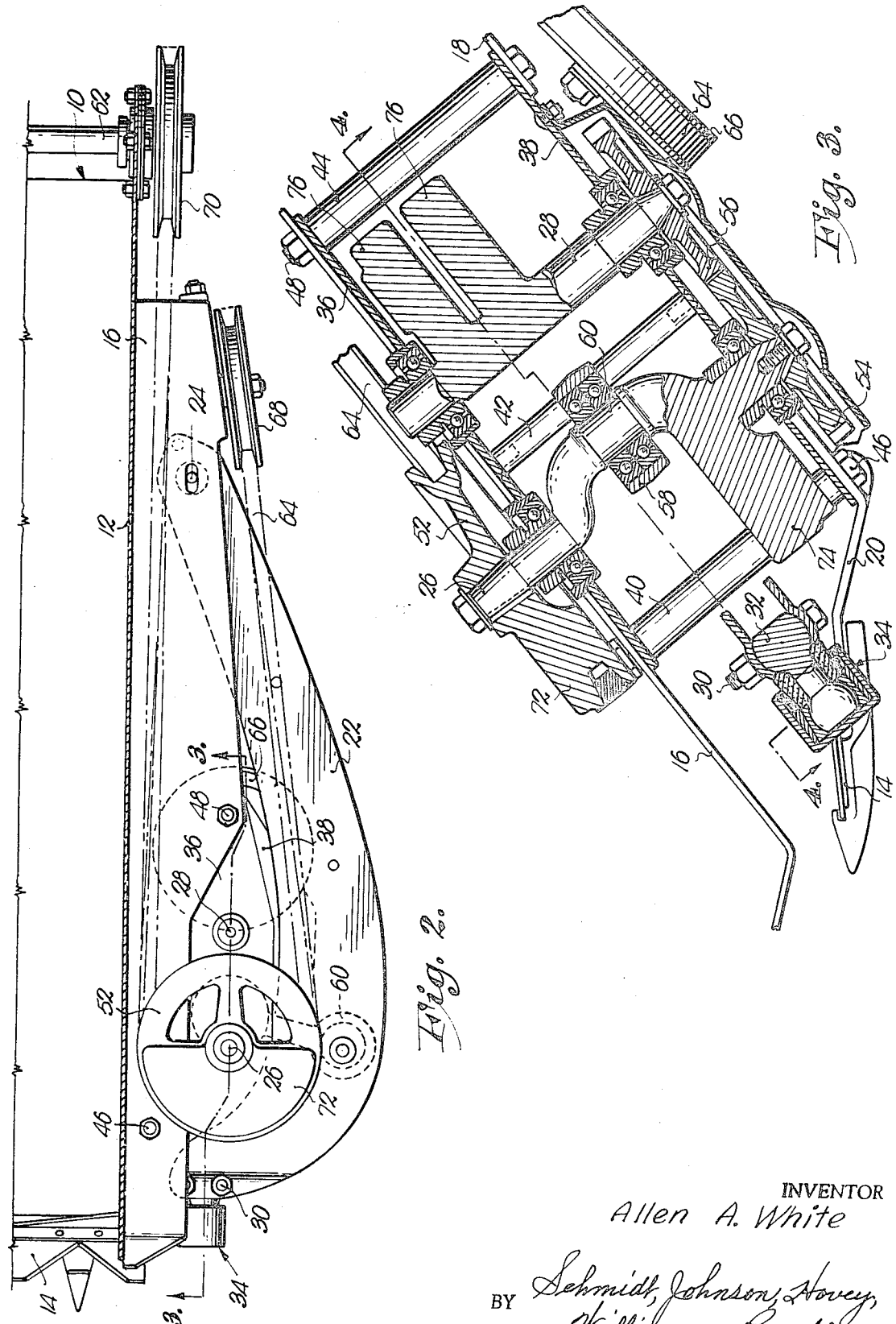

3,546,864
VIBRATION-FREE DRIVE FOR
RECIPROCABLE DEVICES
Allen A. White, Peabody, Kans., assignor to Hesston Corporation, Hesston, Kans., a corporation of Kansas
Filed Oct. 31, 1968, Ser. No. 772,312
Int. Cl. A01d 47/00, 55/02
U.S. Cl. 56—296                10 Claims

ABSTRACT OF THE DISCLOSURE

A horizontally reciprocable sickle for farm implements is provided with a drive which is essentially vibration-free and includes a counterbalanced sway bar that is inclined upwardly and rearwardly from the sickle. The upper end of the bar is pivotally mounted on a supporting part of the implement and the lower end of the bar is pivotally coupled with one end of the sickle. A counterbalanced crankshaft, inclined oppositely to the bar, is interposed between said supporting part and the bar, and is operably coupled with the latter by a connecting rod. An additional, free running counterbalance is driven by the crankshaft through gears, the entire arrangement being such as to counteract substantially all of the unbalancing effect of the moving components.

---

Sickle drives for farm implements employing sway bars have many advantages over other types of drives, and have proved quite successful for many years. However, vibration is always a problem, and although there have been suggested solutions, none, insofar as I am aware, are suitable for use in connection with sway bar drives.

It is, therefore, an important object of my invention to provide a substantially vibration-free sickle drive through use of a counterbalance sway bar.

Another important object of the instant invention is the provision in a sway bar type of drive for sickles of a unique counterbalance arrangement that is effective in preventing all deleterious vibration notwithstanding construction and location limitations.

Still another important object of my invention is to provide a counterbalance assembly using counterbalance weights which pass within their centers of gravity, permitting disposition of their axes of rotation close together, and therefore, use of relatively small interconnecting gears.

A further important object of the present invention is the provision of a drive of the aforesaid character that is especially adapted for use with windrowers and capable of support, in its entirety, by one end of the windrow header.

In the drawings:

FIG. 1 is a side elevational view of a vibration-free drive for reciprocable devices made pursuant to the present invention, the implement upon which the drive is mounted being shown only fragmentarily;

FIG. 2 is a plan view of the drive, again with the implement shown only in part, taken on line 2—2 of FIG. 1;

FIG. 3 is an enlarged fragmentary cross-sectional view taken on line 3—3 of FIG. 2;

FIG. 4 is a fragmentary cross-sectional view taken on line 4—4 of FIG. 3; and

FIG. 5 is a fragmentary detail cross-sectional view taken on line 5—5 of FIG. 4.

The numeral 10 designates a header for a windrower shown only fragmentarily in the drawings, but illustrated more clearly, for example, in U.S. Pats. 3,224,117 and 3,241,300. Header 10 has an upright end wall 12 and a horizontally reciprocable sickle 14 at its forwardmost leading edge. The drive for sickle 14 is releasably mounted on header 10 through the medium of a pair of spaced, inclined plates 16 and 18 welded to the outer face of wall 12 and a short bracket 20 secured to the cutter bar for sickle 14.

A double plate sway bar 22, inclined upwardly and rearwardly from the proximal end of sickle 14, has its upper end releasably coupled with plates 16 and 18 therebetween by a pivot pin 24 whose inclined axis is perpendicular to plates 16 and 18, but parallel to a crankshaft 26 and an idler shaft 28. The lowermost and forwardmost end of bar 22 has pivotal connection with sickle 14 by means of a pair of removable bolts 30 which clamp the plates of bar 22 to an elongated head 32 of a ball and socket joint 34, the socket structure of which forms a part of the sickle 14.

The shafts 26 and 28 are journalled in bearings, as shown, carried by spaced plates 36 and 38 held parallel by spacers 40, 42 and 44. Bolts 46 and 48 passing through spacers 40 and 44 attach plates 36 and 38 to plate 16, bolt 46 serving to attach plate 38 to bracket 20 and bolt 48 serving to attach plate 38 to plate 18. Plates 18 and 38 are also joined by a bolt 50.

Shaft 26 is driven from a pulley 52 and shaft 28 is driven by intermeshing gears 54 and 56 on shafts 26 and 28 respectively. Bar 22 is driven by a connecting rod 58 pivotally connecting bar 22 with crank 60 of shaft 26. Pulley 52 is driven from a shaft 62 by a belt 64 which passes over pulleys 66, 68 and 70. Counterbalance weights 72, 74 and 76 are provided on pulley 52, shaft 26 and 28 respectively.

Noteworthy is the fact that when weight 76 is in opposed relationship to weights 72 and 76 (FIG. 4) they counteract each other. When sickle 14 is at one end of its path of travel, all three weights are overlapped on one side of shaft 26 opposite to crank 60, rod 58 and bar 22, whereas when sickle 14 is at the opposite end of its path of travel, the weights are overlapped on the same side of shaft 26 as rod 58 and bar 22. Thus, the combined unbalancing effect of sickle 14, bar 22 and crank 60 is counterbalanced during movement of sickle 14 in each direction. The positioning of the shafts 26 and 28 between the sway bar 22 and the wall 12 as close as possible to the sickle 14 reduces the extent to which the entire drive extends outwardly beyond the vertical, outer surface of wall 12, and the disposition of the entire drive on an incline raises its lowermost extremities sufficiently to prevent dragging even when sickle 14 is in its lowermost cutting position. The arrangement is such also as to permit the use of a belt drive in an advantageous manner, operating as above described. The relatively short coupling presents a compact, easily and inexpensively manufactured unit capable of being maintained in service without need for skill beyond that of the user or authorized personnel.

Having thus described the invention, what is claimed as new and desired to be secured by Letters Patent is:

1. In cutting mechanism;
   a support;
   a sickle reciprocably carried by said support;
   a sway bar;
   a first pivotal coupling at one end of the bar mounting the latter on the support for swinging movement relative to the support;
   a second pivotal coupling between one end of the sickle and the opposite end of the bar for reciprocating the sickle during swinging of the bar;
   a drive pivotally connected with said bar intermediate said ends of the bar for swinging the latter; and
   structure operably associated with said drive for counteracting the unbalancing effect of the sickle and the bar.

2. In cutting mechanism as claimed in claim 1,
said drive including a rotatable crankshaft and a connecting rod pivotally joined with the crank of said shaft and with said bar,
said structure also counteracting the unbalancing effect of the crank and of the rod.

3. In cutting mechanism as claimed in claim 2; and
an idler shaft operably connected with the crankshaft for rotation thereby in a direction opposite to the direction of rotation of the crankshaft,
said structure including counterbalance weight means mounted on each shaft respectively for rotation therewith,
said weight means being arranged to counteract the unbalancing effect of each other.

4. In cutting mechanism as claimed in claim 3,
said weight means moving into and out of overlapping relationship to each other during rotation of the shafts.

5. In cutting mechanism as claimed in claim 1,
said sickle being disposed in a substantially horizontal plane at the normally forwardmost edge of the support,
said bar being disposed at one end of the support and extending at an angle upwardly and rearwardly from said second coupling.

6. In cutting mechanism as claimed in claim 5,
said drive including a crankshaft between said bar and said one end of the support, carried by the support for rotation between said couplings about an inclined axis parallel to said first coupling, and a connecting rod pivotally joined with the crank of said shaft and with said bar,
said structure also counteracting the unbalancing effect of the crank and of the rod.

7. In cutting mechanism as claimed in claim 6;
an idler shaft between said bar and said one end of the support, carried by the support for rotation between the crankshaft and the first coupling about an axis parallel with the axis of rotation of the crankshaft; and
means connecting the idler shaft with the crankshaft for rotation thereby in a direction opposite to the direction of rotation of the crankshaft,
said structure including counterbalance weight means mounted on each shaft respectively for rotation therewith,
said weight means being arranged to counteract the unbalancing effect of each other.

8. In cutting mechanism as claimed in claim 7,
said support having lateral extensions rigid thereto and releasably receiving said first coupling,
said shafts being provided with a mount releasably attached to said extensions.

9. In cutting mechanism as claimed in claim 8,
said mount including a pair of interconnected plates journaling said shafts and provided with spacers between the plates holding the latter parallel.

10. In cutting mechanism as claimed in claim 9, said weight means being disposed between the plates.

References Cited
UNITED STATES PATENTS

| | | | |
|---|---|---|---|
| 2,691,863 | 10/1954 | Krause | 56—296 |
| 2,942,483 | 6/1960 | Evans et al. | 74—40 |
| 3,224,177 | 12/1965 | Adee | 56—23 |
| 3,300,953 | 1/1967 | Glass | 56—23 |

RUSSELL R. KINSEY, Primary Examiner

U.S. Cl. X.R.

56—23; 74—40